United States Patent [19]

Ohtsuka

[11] 4,282,773

[45] Aug. 11, 1981

[54] CHANGE-SPEED TRANSMISSION

[75] Inventor: Kunio Ohtsuka, Yokohama, Japan

[73] Assignee: Nissan Motor Company, Limited, Yokohama, Japan

[21] Appl. No.: 899,992

[22] Filed: Apr. 25, 1978

[30] Foreign Application Priority Data

May 13, 1977 [JP] Japan .................................. 52/54207

[51] Int. Cl.³ .............................................. F16H 47/08
[52] U.S. Cl. ......................................... 74/688; 74/763
[58] Field of Search ................... 74/762, 763, 765, 767, 74/688, 759

[56] References Cited

U.S. PATENT DOCUMENTS

| | | | |
|---|---|---|---|
| 3,722,323 | 3/1973 | Welch | 74/688 X |
| 3,835,732 | 9/1974 | Mori et al. | 74/765 X |
| 4,157,046 | 6/1979 | O'Malley | 74/763 |

FOREIGN PATENT DOCUMENTS

| | | |
|---|---|---|
| 1530792 | 11/1964 | Fed. Rep. of Germany . |
| 2259304 | 12/1972 | Fed. Rep. of Germany . |
| 2645988 | 10/1976 | Fed. Rep. of Germany . |
| 726697 | 3/1955 | United Kingdom . |
| 975885 | 11/1964 | United Kingdom . |
| 1131360 | 10/1968 | United Kingdom . |
| 1142052 | 2/1969 | United Kingdom . |
| 1177263 | 1/1970 | United Kingdom . |

*Primary Examiner*—Kenneth Downey
*Attorney, Agent, or Firm*—Lowe, King, Price & Becker

[57] ABSTRACT

A change-speed transmission comprises: an input member; an output member; a planetary gearing unit; a hydrokinetic unit having a pump connected to the input member for simultaneous rotation therewith and a turbine; and first, second and third clutches. The transmission has a condition in which all of the torque of the input member is transmitted to the output member through the hydrokinetic unit, a condition in which all of the torque of the input member is transmitted to the output member bypassing the hydrokinetic unit, and a condition in which a portion of the torque of the input member is transmitted to the output member bypassing the hydrokinetic unit and the remaining portion of the torque of the input member is transmitted to the output member through the hydrokinetic unit.

16 Claims, 12 Drawing Figures

CHANGE-SPEED TRANSMISSION

BACKGROUND OF THE INVENTION

The present invention relates to change-speed transmissions and more particularly to an automatic transmission using a hydrokinetic unit, such as a torque converter, followed by a planetary gearing unit.

The conventional automatic transmission of the above type has the following advantages when used in an automobile:

(1) The hydrokinetic unit insures smooth and effortless start-up of the automobile;

(2) It insures shockless shifting even when the accelerator is kept depressed;

(3) It absorbs mechanical vibration derived from variations of torque of the engine; and (4) It lengthens the life span of the associated planetary gearing unit.

However, the automatic transmission has the following disadvantages:

(1) It causes the associated engine to consume more fuel than if equipped with a manual transmission, and;

(2) It has a sluggish response to demand for engine braking.

In an attempt to alleviate these disadvantages, there has been proposed an automatic transmission having a hydraulic torque converter with at least one clutch and planetary gear set combination in which torque of the engine is split and transmitted through two flow paths. In this prior art automatic transmission, the direct drive or bypass clutch is selectively operable to interconnect the pump of the hydraulic torque converter and the turbine thereof for simultaneous rotation therewith to thereby bypass the torque converter and eliminate slippage in the transmission. In other words, the torque can be transmitted either totally through the torque converter, or directly, but nothing in between. In a second prior art transmission, a gearing unit has a rotary element connected to the turbine of the torque converter, and the pump is connected to another rotary element so that the input torque of the engine is at all times transmitted through two flow paths, one including the torque converter, and the other including the other rotary element. In this arrangement, the hydrokinetic unit cannot be totally bypassed.

A disadvantage with the first prior art automatic transmission mentioned above resides in that the fuel economy during all low and middle speed operating is still compromised. The economy is bad because under these operations conditions, the direct clutch is disengaged and the hydraulic torque converter delivers the full torque from the engine to the gearing unit. Another disadvantage is that over a given range of speed of rotation, the variation of torque of the engine is great. This is especially undesirable during the middle and relatively high speed ranges after the direct clutch has been engaged. As the automobile slows down in these ranges, the engine tends to start "lugging" causing a rough driving condition and undue wear on the engine. In the second mentioned prior art transmission, the shortcoming arises because overall operating conditions, ranging from low speed operation to high speed operation, a portion of torque is always transmitted from the engine to the gearing unit through the torque converter. Thus, the overall fuel economy leaves much to be desired due to the slip of the torque converter in the high speed operation.

SUMMARY OF THE INVENTION

It is, therefore, an object of the present invention to provide, for the purpose of alleviating the disadvantages encountered in the prior art, a change-speed transmission which takes the best of the two prior art transmissions, thereby giving the optimum fuel economy. The transmission of the present invention is not limited to the "all or nothing" condition of the first mentioned prior art transmission since in the middle speed ranges a split of the torque is obtained. By the same token, 100 percent direct drive can be obtained in the highest speed ratio, not just partial direct drive, as found in the second described prior art transmission.

Thus, in the transmission of the present invention, all of the engine torque is effected through a hydrokinetic unit to provide smooth start-up of an automobile from standstill. Secondly, the transmission has a condition in which the transmission of all (100%) of the engine torque is effected bypassing the hydrokinetic unit for maximum economy. And, finally, a condition exists in which the transmission of the engine torque is effected through a split along a first flow path including the hydrokinetic unit and through a second flow path bypassing the hydrokinetic unit.

BRIEF DESCRIPTION OF THE DRAWINGS

The invention will be described hereinafter in connection with the accompanying drawings, in which:

FIGS. 1-12 are schematic diagrams of various embodiments of a change speed transmission of the invention.

DETAILED DESCRIPTION OF THE PREFERRED EMBODIMENTS

Figure 1:
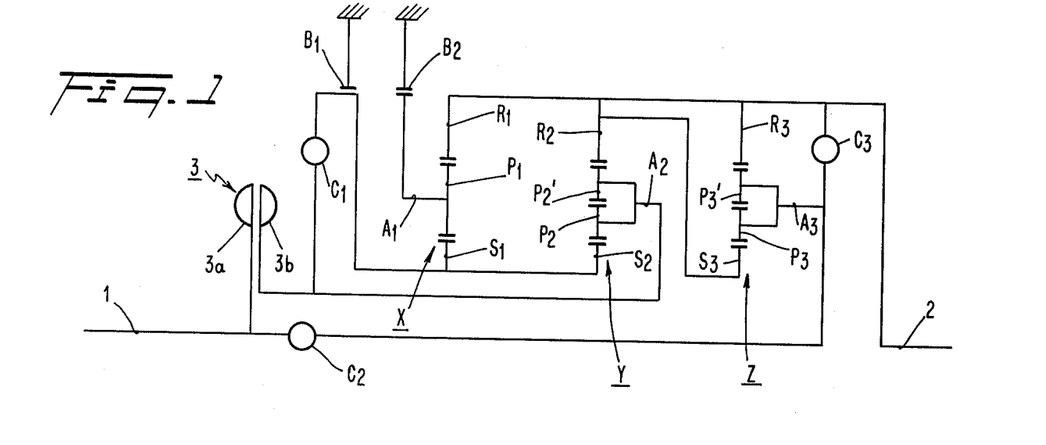

FIG. 1 shows the first embodiment of the invention, in which the reference numeral 1 indicates an input shaft, the reference numeral 2 an output shaft, and between the input shaft and output shaft 1 and 2, three planetary gear sets X, Y and Z are arranged with their axes aligned.

The first planetary gear set X is a basic or simple planetary gear set constructed of a first sun gear $S_1$, a first ring gear $R_1$ and a first carrier $A_1$ rotatably supporting a plurality of pinions $P_1$ each meshing the sun gear $S_1$ and ring gear $R_1$.

The secondary planetary gear set Y is a dual-intermeshed planet pinion planetary gear set constructed of a second sun gear $S_2$, a second ring gear $R_2$ and a second carrier $A_2$ rotatably supporting a plurality of pairs of intermeshing pinions $P_2$ and $P_2'$. Each pinion $P_2$ meshes with the sun gear $S_2$, while each pinion $P_2'$ meshes with the ring gear $R_2$.

The third planetary gear set Z is a dual-intermeshed planet pinion planetary gear set, similar to the second planetary gear set Y, constructed of a third sun gear $S_3$, a third ring gear $R_3$ and a third carrier $A_3$ rotatably supporting a plurality of pairs of intermeshing pinions $P_3$ and $P_3'$. Each pinion $P_3$ meshes with the sun gear $S_3$, while each pinion $P_3'$ meshes with the ring gear $R_3$.

In the first planetary gear set X, the following equation holds.

$$N_{R1} + \alpha_1 N_{S1} = (I + \alpha_1) N_{A1} \tag{1}$$

In the second planetary gear set Y, the following equation holds.

$$N_{R2} - \alpha_2 N_{S2} = (l - \alpha_2) N_{A2} \qquad (2)$$

In the third planetary gear set Z, the following equation holds.

$$N_{R3} - \alpha_3 N_{S3} = (l - \alpha_3) N_{A3} \qquad (3)$$

where, $N_{R1}$, $N_{R2}$ and $N_{R3}$ denote the number of rotations of ring gears of planetary gear sets X, Y and Z, respectively.

$N_{S1}$, $N_{S2}$ and $N_{S3}$ denote the number of rotations of sun gears of the planetary gear sets X, Y and Z, respectively.

$\alpha_1$, $\alpha_2$, and $\alpha_3$ denote the ratio of number of teeth of a sun gear to number of teeth of a ring gear of the planetary gear sets X, Y and Z, respectively.

The transmission according to the invention comprises an input shaft 1 supplying the input torque, a hydraulic torque converter 3 having a pump 3a connected to the input shaft 1 for simultaneous rotation therewith and a turbine 3b connected to the second carrier $A_2$ for simultaneous rotation therewith. First sun gear $S_1$ and second sun gear $S_2$ are connected to each other for simultaneous rotation and are connectable, for simultaneous rotation, to second carrier $A_2$ through a first clutch $C_1$ and brakeable by a first brake $B_1$. First carrier $A_1$ is brakeable by a second brake $B_2$ and first ring gear $R_1$ and third ring gear $R_3$ are both connected to output shaft 2 to provide one path for the output torque. Second ring gear $R_2$ is connected to third sun gear $S_3$ for simultaneous rotation therewith. Third carrier $A_3$ is connectable to the input shaft 1 through a second clutch $C_2$. A third clutch $C_3$ is operable to connect the third carrier $A_3$ to the output shaft 2 and the ring gears $R_1$, $R_3$ for another path for the output torque.

The operating sequence of the three clutches $C_1$, $C_2$ and $C_3$ and two brakes $B_1$ and $B_2$ are tabulated in Table 1, in which legend o denotes the engagement condition of a clutch or applied condition of a brake. In the Table 1 reduction gear ratio and the direct transmission rate, i.e., the rate of a portion of torque transmitted through second clutch $C_2$ bypassing torque converter 3 to all of the torque of input shaft 1, are calculated on the assumption that $\alpha_1 = 0.35$, $\alpha_2 = 0.40$ and $\alpha_3 = 0.45$.

TABLE 1

| | $C_1$ | $C_2$ | $C_3$ | $B_1$ | $B_2$ | Gear Ratio | Direct Transmission Rate (%) |
|---|---|---|---|---|---|---|---|
| 1st speed | | o | | | o | $\dfrac{\alpha_1 + \alpha_2}{\alpha_1(l - \alpha_2)}$ | 0.0 |
| 2nd speed | o | | | | o | $\dfrac{\alpha_1 + \alpha_2\alpha_3}{\alpha_1(l - \alpha_2\alpha_3)}$ | 1.847 67.1 |
| 3rd speed | o | | o | | | $\dfrac{1}{1 - \alpha_2\alpha_3}$ | 1.220 67.1 |
| 4th speed | o | o | | | | 1.0 | 1.000 100.0 |
| Rev. | | o | | | o | $-\dfrac{1}{\alpha_1}$ | -2.857 0.0 |

Referring to FIGS. 2 through 12, the other embodiments of the invention will be described hereinafter. In these embodiments, like reference numerals and characters to those used in FIG. 1 are used to denote like component parts. Since the same or similar function is being carried out in each instance by the parts with like references, no additional or distinguishing identification is necessary or desirable.

Figure 2:
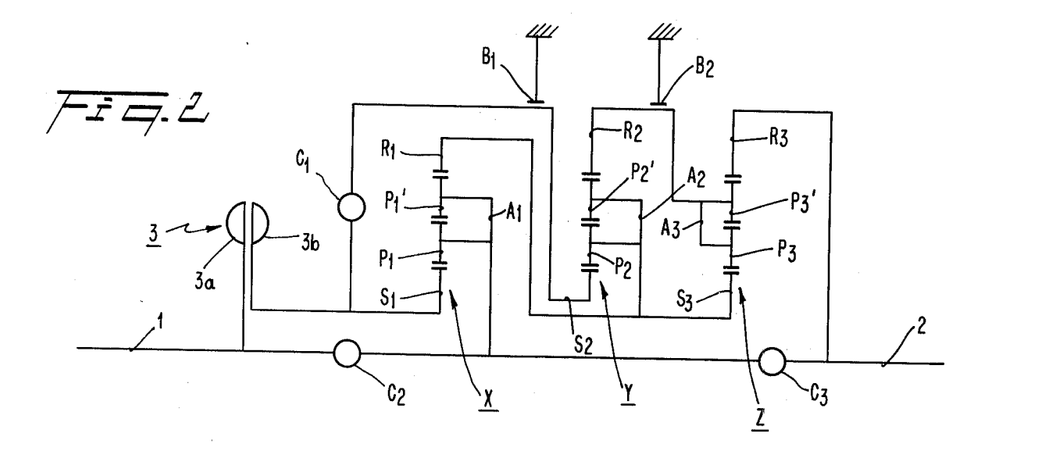

In the second embodiment shown in FIG. 2, a first planetary gear set X is a dual-intermeshed planet pinion planetary gear set which has a first sun gear $S_1$, a first ring gear $R_1$ and a first carrier $A_1$ rotatably supporting a plurality of pairs of intermeshing pinions $P_1$ and $P_1'$. Each pinion $P_1$ meshes with the sun gear $S_1$, while each pinion $P_1'$ meshes with the ring gear $R_1$. Second and third planetary gear sets Y and Z shown in FIG. 2 are dual-intermeshed planet pinion planetary gear sets similar to those shown in FIG. 1.

In planetary gear set X of this embodiment, the following equation holds.

$$N_{R1} - \alpha_1 N_{S1} = (l - \alpha_1) N_{A1} \qquad (4)$$

In the second and third planetary gear sets Y and Z of this embodiment, equations (2) and (3) hold.

The transmission of FIG. 2 comprises an input shaft 1 providing the input torque, a hydraulic torque converter 3 which has a pump 3a connected to the input shaft 1 for simultaneous rotation therewith and a turbine 3b connected to first sun gear $S_1$. First sun gear $S_1$ is connectable to a second sun gear $S_2$ through a first clutch $C_1$ and the second sun gear $S_2$ is brakeable by a first brake $B_1$. First carrier $A_1$ is connectable to input shaft 1 through a second clutch $C_2$, and also to output shaft 2 through a third clutch $C_3$ providing one output torque path. First ring gear $R_1$ is connected both to second carrier $A_2$ and third sun gear $S_3$ for simultaneous rotation therewith. Second ring gear $R_2$ and third carrier $A_3$ are connected to each other for simultaneous rotation and they are brakeable by means of a second brake $B_2$. Third ring gear $R_3$ is connected to output shaft 2 creating another output torque path.

The operating sequence of three clutches $C_1$, $C_2$ and $C_3$ and two brakes $B_1$ and $B_2$ of the FIG. 2 transmission is tabulated in Table 2 on the assumption that $\alpha_1 = \alpha_2 = 0.40$ and $\alpha_3 = 0.50$.

TABLE 2

| | $C_1$ | $C_2$ | $C_3$ | $B_1$ | $B_1$ | Gear Ratio | Direct Transmission Rate (%) |
|---|---|---|---|---|---|---|---|
| 1st speed | | | o | | o | $\dfrac{1 - \alpha_3(1 - \alpha_1)}{\alpha_1\alpha_3}$ | 3.500 0 |
| 2nd speed | | o | | | o | $\dfrac{1}{\alpha_3}$ | 2.000 60 |
| 3rd speed | | o | o | | | $\dfrac{1}{1 - \alpha_2 + \alpha_2\alpha_3}$ | 1.250 60 |
| 4th speed | o | o | | | | 1.0 | 1.000 100 |
| Rev. | o | | | | o | $-\dfrac{1 - \alpha_2}{\alpha_2\alpha_3}$ | -3.000 0 |

Figure 3:
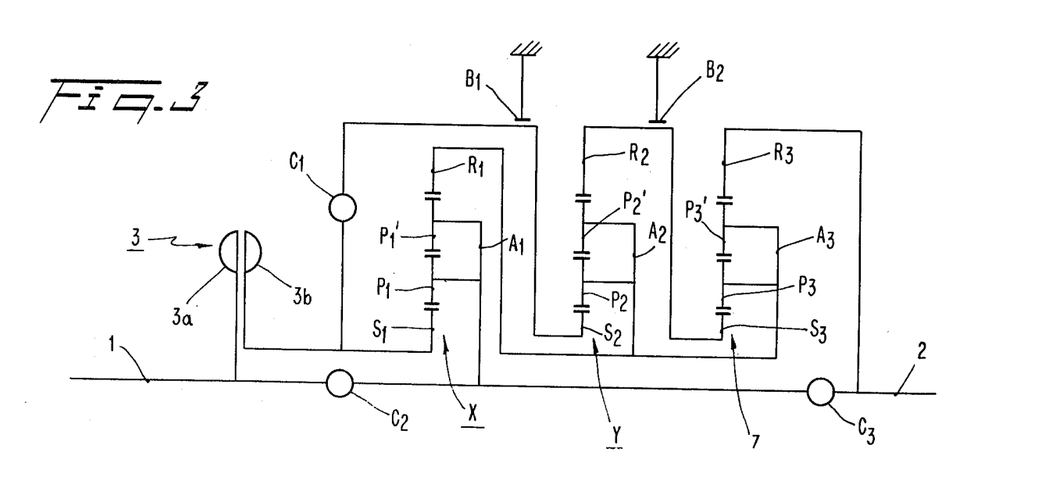

In the third embodiment shown in FIG. 3, first, second and third planetary gear sets X, Y and Z are dual-intermeshed planet pinion planetary gear sets similar to those shown in FIG. 2. Therefore, equations (4), (2) and (3) hold for these first, second and third planetary gear sets, X, Y and Z respectively.

The transmission shown in FIG. 3 comprises an input shaft 1, a hydraulic torque converter 3 having a pump 3a connected to the input shaft 1 for simultaneous rotation therewith and a turbine 3b connected to first sun gear $S_1$ for simultaneous rotation therewith. First sun gear $S_1$ is connectable to second sun gear $S_2$ through a first clutch $C_1$ and the second sun gear is brakeable by means of a first brake $B_1$. First carrier $A_1$ is connectable to input shaft 1 through a second clutch $C_2$ and also to output shaft 2 through a third clutch $C_3$ for a first output torque path. First ring gear $R_1$ is connected both to second carrier $A_2$ and third carrier $A_3$ for simultaneous rotation therewith. Second ring gear $R_2$ and third sun gear $S_3$ are connected to each other for simultaneous rotation and are brakeable by means of a second brake $B_2$. Third ring gear $R_3$ is connected to output shaft 2 for simultaneous rotation to provide a second output torque path.

Figure 4:
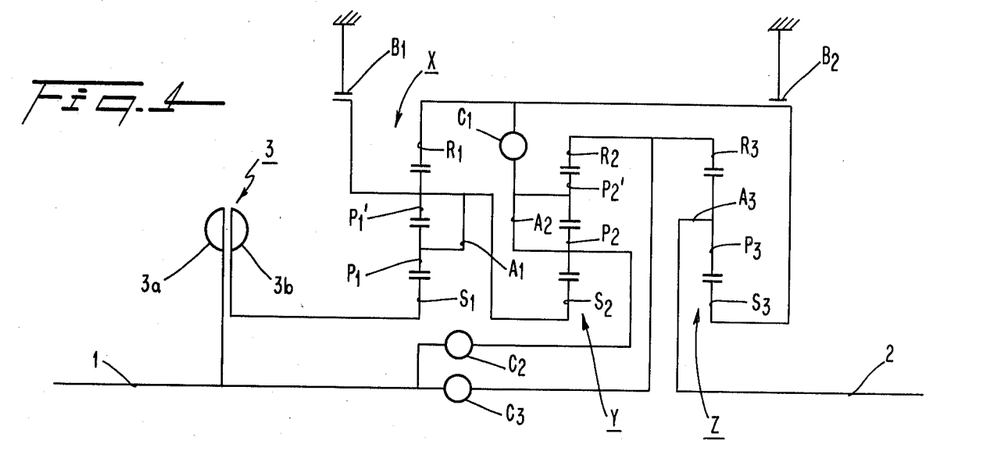

The operating sequence of three clutches $C_1$, $C_2$ and $C_3$ and two brakes $B_1$ and $B_2$ of the transmission shown in FIG. 3 is tabulated in Table 3 on the assumption that $\alpha_1=\alpha_2=0.35$ and $\alpha_3=0.50$.

respectively, while, for the third planetary gear set Z, the following equation holds.

$$N_{R3}+\alpha_3 N_{S3}=(1+\alpha_3)N_{A3} \quad (5)$$

The transmission shown in FIG. 4 comprises an input shaft 1, a hydraulic torque converter 3 having a pump 3a connected to the input shaft 1 for simultaneous rotation therewith and a turbine 3b connected to sun gear $S_1$ for simultaneous rotation therewith. Carrier $A_1$ and sun gear $S_2$ are connected to each other for simultaneous rotation and are brakeable by means of a first brake $B_1$. Ring gear $R_1$ is connectable to carrier $A_2$ through a first clutch $C_1$. This carrier $A_2$ is connectable to input shaft 1 through a second clutch $C_2$. Ring gear $R_1$ and sun gear $S_3$ are connected to each other for simultaneous rotation and are brakeable by a second brake $B_2$. Ring gears $R_2$ and $R_3$ are connected to each other for simultaneous rotation and are connectable to input shaft 1 through a third clutch $C_3$. Carrier $A_3$ is connected to an output shaft 2 for providing the output torque.

TABLE 3

|  | $C_1$ | $C_2$ | $C_3$ | $B_1$ | $B_1$ |  | Gear Ratio | Direct Transmission Rate (%) |
|---|---|---|---|---|---|---|---|---|
| 1st speed |  | o |  |  | o | $\dfrac{1-(1-\alpha_1)(1-\alpha_3)}{\alpha_1(1-\alpha_3)}$ | 3.857 | 0 |
| 2nd speed |  | o |  | o |  | $\dfrac{1}{1-\alpha_3}$ | 2.000 | 65 |
| 3rd speed |  | o | o |  |  | $\dfrac{1}{1-\alpha_2\alpha_3}$ | 1.212 | 65 |
| 4th speed |  | o | o |  |  | 1.0 | 1.000 | 100 |
| Rev. | o |  |  |  | o | $-\dfrac{1-\alpha_2}{\alpha_2(1-\alpha_3)}$ | −3.714 | 0 |

In the embodiment shown in FIG. 4, a first planetary gear set X and a second planetary gear set Y are dual-intermeshed planet pinion planetary gear sets, similar to those shown in FIG. 3, while a third planetary gear set Z is a basic planetary gear set.

Therefore, equations (4) and (2) hold for the first and second planetary gear sets X and Y of this embodiment, The operation sequence of three clutches $C_1$, $C_2$ and $C_3$ and two brakes $B_1$ and $B_2$ of this transmission is tabulated in Table 4 on the assumption that $\alpha_1=\alpha_2=\alpha_3=0.45$.

TABLE 4

|  | $C_1$ | $C_2$ | $C_3$ | $B_1$ | $B_2$ |  | Gear Ratio | Direct Transmission Rate (%) |
|---|---|---|---|---|---|---|---|---|
| 1st speed | o |  |  |  | o | $\dfrac{1+\alpha_3}{\alpha_1(1-\alpha_2+\alpha_3)}$ | 3.222 | 0 |
| 2nd speed |  | o |  |  | o | $\dfrac{1+\alpha_3}{1-\alpha_2+\alpha_1\alpha_3}$ | 1.927 | 73 |
| 3rd speed |  |  | o | o |  | $\dfrac{1+\alpha_3}{1+\alpha_1\alpha_3}$ | 1.206 | 83 |
| 4th speed | o | o | o |  |  | 1.0 | 1.000 | 100 |
| Rev. | o |  |  |  | o | $-\dfrac{(1-\alpha_1)(1+\alpha_3)}{\alpha_1\alpha_2}$ | −3.938 | 0 |

Figure 5:
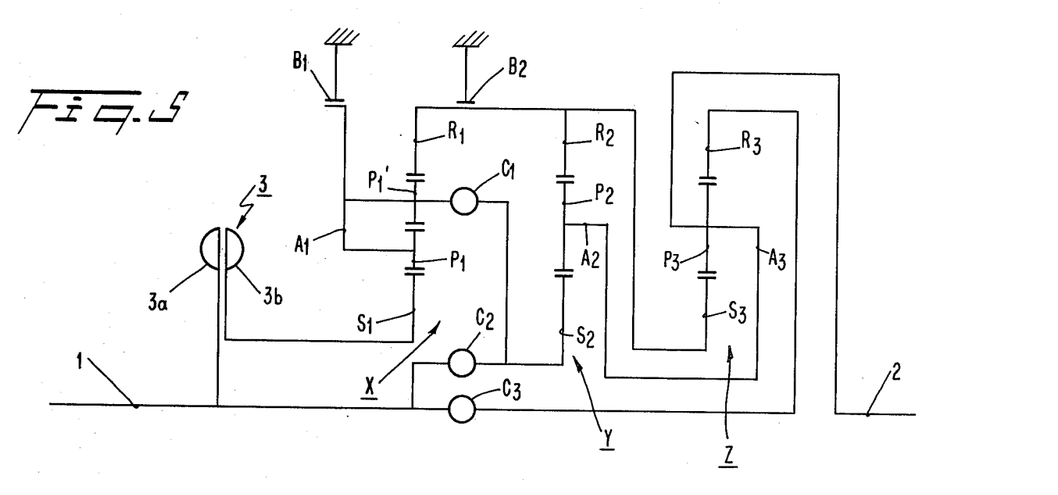

In the fifth embodiment shown in FIG. 5, a first planetary gear set X is a dual-intermeshed planet pinion planetary gear set, while second and third planetary gear sets Y and Z are basic planetary gear sets.

Equations (4) and (5) hold for first and third planetary gear sets X and Z of the transmission, respectively, and for second planetary gear set Y thereof, the following equation holds.

$$N_{R2} + \alpha_2 N_{S2} = (1 + \alpha_2) N_{A2} \quad (6)$$

This transmission comprises an input shaft 1, a hydraulic torque converter 3 having a pump 3a connected to the input shaft 1 for simultaneous rotation therewith and a turbine 3b connected to sun gear $S_1$ for simultaneous rotation therewith. Carrier $A_1$ is brakeable by means of a first brake $B_1$ and is also connectable to sun gear $S_2$ through a first clutch $C_1$. This sun gear $S_2$ is connectable to input shaft 1 through a second clutch $C_2$. Ring gear $R_1$, ring gear $R_2$ and sun gear $S_3$ are connected to one another for simultaneous rotation and are brakeable by means of a second brake $B_2$. Carriers $A_2$ and $A_3$ and output shaft 2 are connected to one another for simultaneous rotation to produce the output torque. Ring gear $R_3$ is engageable with input shaft 1 through a third clutch $C_3$.

The operation sequence of three clutches $C_1$, $C_2$ and $C_3$ and two brakes $B_1$ and $B_2$ on the assumption that $\alpha_1 = 0.40$ and $\alpha_2 = \alpha_3 = 0.45$ is shown in Table 5.

TABLE 5

| | $C_1$ | $C_2$ | $C_3$ | $B_1$ | $B_2$ | | Gear Ratio | Direct Transmission Ratio (%) |
|---|---|---|---|---|---|---|---|---|
| 1st speed | o | | | o | | $\dfrac{1 + \alpha_2}{\alpha_1}$ | 3.625 | 0.0 |
| 2nd speed | | o | | o | | $\dfrac{1 + \alpha_2}{\alpha_1 + \alpha_2}$ | 1.706 | 52.9 |
| 3rd speed | | | o | o | | $\dfrac{1 + \alpha_3}{1 + \alpha_1 \alpha_3}$ | 1.229 | 84.7 |
| 4th speed | | o | o | | | 1.0 | 1.000 | 100.0 |
| Rev. | o | | | | o | $-\dfrac{(1 + \alpha_2)(1 - \alpha_1)}{\alpha_1 \alpha_2}$ | −4.833 | 0.0 |

Figure 6:
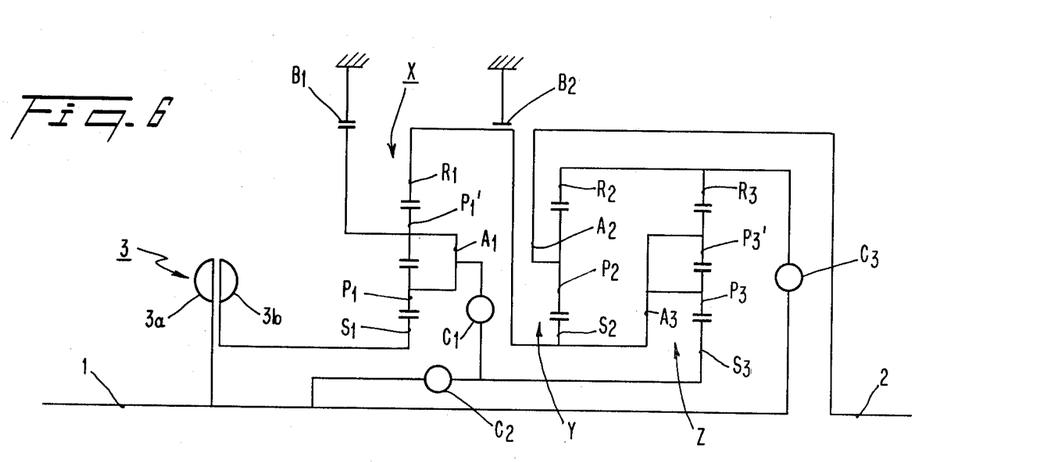

In the sixth embodiment shown in FIG. 6, a first planetary gear set X and a third planetary gear set Z are dual-intermeshed planet pinion planetary gear sets, respectively, while, a second planetary gear set Y is a basic planetary gear set.

Equations (4), (6) and (3) hold for first, second and third planetary gear sets X, Y and Z of this transmission.

This transmission comprises an input shaft 1, a hydraulic torque converter 3 having a pump 3a connected to the input shaft 1 for simultaneous rotation therewith and a turbine 3b connected to sun gear $S_1$ for simultaneous rotation therewith. Carrier $A_1$ is connectable to sun gear $S_3$ through a first clutch $C_1$ and brakeable by means of a first brake $B_1$. Sun gear $S_3$ is connectable to input shaft 1 through a second clutch $C_2$. Ring gear $R_1$, sun gear $S_2$ and carrier $A_3$ are connected to one another for simultaneous rotation and are brakeable by means of a second brake $B_2$. Ring gears $R_2$ and $R_3$ are connected to each other for simultaneous rotation and are connectable to input shaft 1 through a third clutch $C_3$. Carrier $A_2$ is connected to an output shaft 2 for providing the output torque.

The operating sequence of three clutches $C_1$, $C_2$ and $C_3$ and two brakes $B_1$ and $B_2$ of this transmission is tabulated in Table 6 on the assumption that $\alpha_1 = \alpha_3 = 0.40$ and $\alpha_2 = 0.35$.

TABLE 6

| | $C_1$ | $C_2$ | $C_3$ | $B_1$ | $B_2$ | Gear Ratio | Direct Transmission Rate (%) |
|---|---|---|---|---|---|---|---|
| 1st speed | o | | | o | | $\dfrac{1 + \alpha_2}{\alpha_1(1 + \alpha_2 - \alpha_3)}$ | 3.553 | 0 |
| 2nd speed | | o | | o | | $\dfrac{1 + \alpha_3}{\alpha_1(1 + \alpha_2 - \alpha_3) + \alpha_3}$ | 1.731 | 51 |
| 3rd speed | | | o | o | | $\dfrac{1 + \alpha_2}{1 - \alpha_1 \alpha_2}$ | 1.184 | 88 |
| 4th speed | | o | o | | | 1.0 | 1.000 | 100 |
| Rev. | o | | | | o | $-\dfrac{(1 - \alpha_1)(1 + \alpha_2)}{\alpha_1 \alpha_3}$ | −5.062 | 0 |

In the seventh embodiment shown in FIG. 7, a first planetary gear set X and a second planetary gear set Y are dual-intermeshed planet pinion planetary gear sets, respectively, while, a third planetary gear set Z is a basic planetary gear set.

Equations (4), (2) and (5) hold for first, second and third planetary gear sets X, Y and Z of this transmission.

This transmission comprises an input shaft 1, a hydraulic torque converter 3 having a pump 3a connected to the input shaft 1 for simultaneous rotation therewith and a turbine 3b connected to sun gear $S_1$ for simultaneous rotation therewith. Carrier $A_1$ is brakeable by means of a first brake $B_1$ and connectable to carrier $A_2$ through a first clutch $C_1$. The carrier $A_2$ is connectable to input shaft 1 through a second clutch $C_2$. Ring gears $R_1$ and $R_3$ and sun gear $S_2$ are connected to each other for simultaneous rotation and are brakeable by means of a second brake $B_2$. Carrier $A_2$ is connected to sun gear $S_3$ for simultaneous rotation therewith. Ring gear $R_2$ is connectable to input shaft 1 through a third clutch $C_3$, while, carrier $A_3$ is connected to output shaft 2 for simultaneous rotation and production of the output torque.

The operating sequence of three clutches $C_1$, $C_2$ and $C_3$ and two brakes $B_1$ and $B_2$ of the transmission shown in FIG. 7 is tabulated in Table 7 on the assumption that $\alpha_1 = \alpha_3 = 0.45$ and $\alpha_2 = 0.60$.

TABLE 7

| | $C_1$ | $C_2$ | $C_3$ | $B_1$ | $B_2$ | Gear Ratio | Direct Transmission Rate (%) |
|---|---|---|---|---|---|---|---|
| 1st speed | o | | | o | | $\dfrac{1+\alpha_3}{\alpha_1}$ | 3.222 | 0 |
| 2nd speed | o | | | | o | $\dfrac{1+\alpha_2}{\alpha_1+\alpha_3}$ | 1.611 | 50 |
| 3rd speed | | | o | o | | $\dfrac{(1-\alpha_2)(1+\alpha_3)}{\alpha_1+\alpha_3-\alpha_1\alpha_2-\alpha_1\alpha_2\alpha_3}$ | 1.141 | 89 |
| 4th speed | | o | o | | | 1.0 | 1.000 | 100 |
| Rev. | o | | | | o | $-\dfrac{(1-\alpha_1)(1+\alpha_2)}{\alpha_1\alpha_3}$ | −3.938 | 0 |

Figure 8:
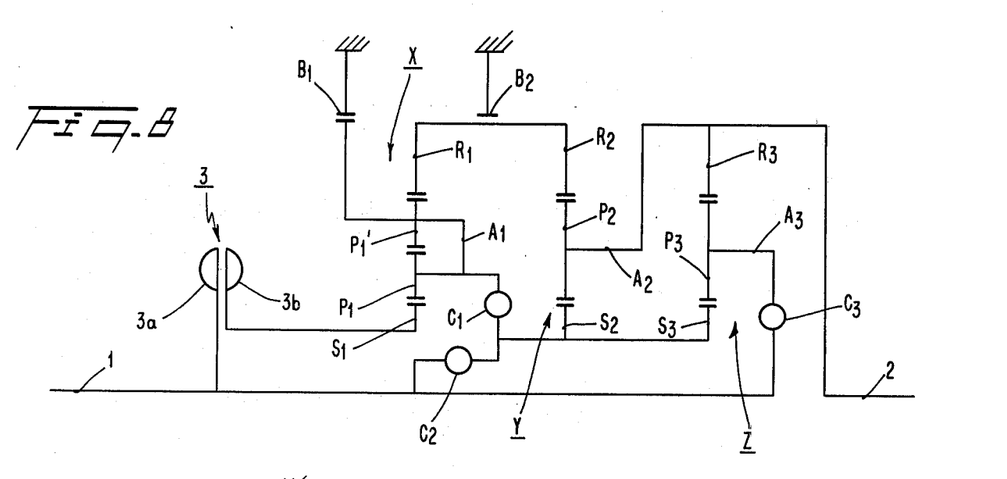

In the eighth embodiment shown in FIG. 8, a first planetary gear set X is a dual-intermeshed planet pinion planetary gear set, while, second and third planetary gear sets Y and Z are basic planetary gear sets, respectively.

Equations (4), (6) and (5) hold for first, second and third planetary gear sets X, Y and Z of this transmission, respectively.

This transmission comprises an input shaft 1, a hydraulic torque converter 3 having a pump 3a connected to the input shaft 1 for simultaneous rotation therewith and a turbine 3b connected to sun gear $S_1$ for simultaneous rotation therewith. Carrier $A_1$ is brakeable by a first brake $B_1$. Sun gears $S_2$ and $S_3$ are connected to each other for simultaneous rotation and are connectable to carrier $A_1$ through a first clutch $C_1$. These sun gears $S_2$ and $S_3$ are connectable to input shaft 1 through a second clutch $C_2$. Ring gears $R_1$ and $R_2$ are connected to each other for simultaneous rotation and are brakeable by a second brake $B_2$. Carrier $A_2$ and ring gear $R_3$ are connected to each other for simultaneous rotation and are connected to an output shaft 2 for simultaneous rotation and output torque production. Carrier $A_3$ is connectable to input shaft 1 through a third clutch $C_3$.

Figure 9:
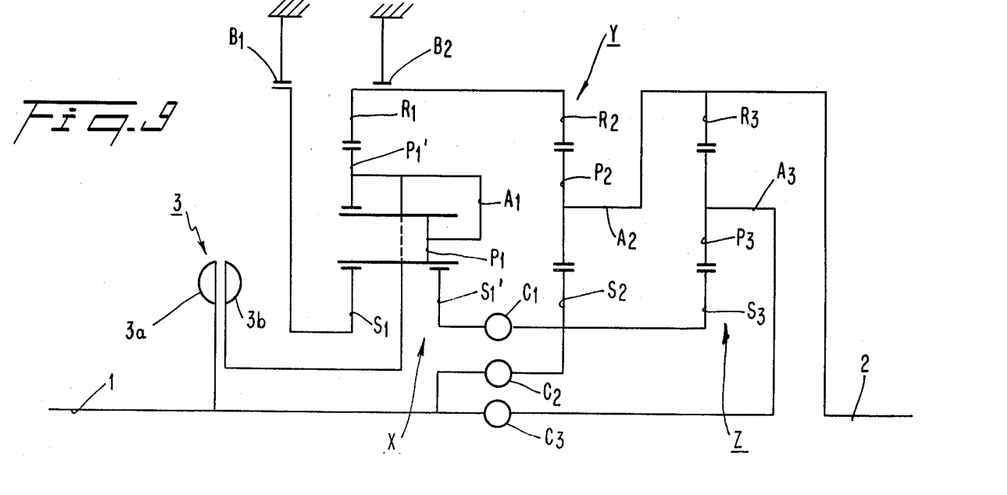

The operating sequence of three clutches $C_1$, $C_2$ and $C_3$ and two brakes $B_1$ and $B_2$ of the transmission shown in FIG. 8 is tabulated in Table 8 on the assumption that $\alpha_1=0.35$ and $\alpha_2$ and $\alpha_3=0.45$.

planetary gear set which comprises two first sun gears $S_1$ and $S_1'$, a first ring gear $R_1$ and a first carrier $A_1$ rotatably supporting a plurality of pairs of intermeshing pinions $P_1$ and $P_1'$. Each pinion $P_1$ meshes with both of the first and second sun gears $S_1$ and $S_1'$, while each pinion $P_1'$ meshes with ring gear $R_1$. A second planetary gear set Y and a third planetary gear set Z are basic planetary gear sets.

Equations (4), (6) and (5) hold for first, second and third planetary gear sets X, Y and Z of this transmission, respectively.

This transmission comprises an input shaft 1, a hydraulic torque converter 3 having a pump 3a connected to the input shaft 1 for simultaneous rotation therewith and a turbine 3b connected to carrier $A_1$ for simultaneous rotation therewith. Sun gear $S_1$ is brakeable by means of a first brake $B_1$, while, sun gear $S_1'$ is connectable to sun gears $S_2$ and $S_3$ through a first clutch $C_1$. Sun gears $S_2$ and $S_3$ are connected to each other for simultaneous rotation and are connectable to input shaft 1 through a second clutch $C_2$. Ring gears $R_1$ and $R_2$ are connected to each other for simultaneous rotation and are brakeable by means of a second brake $B_2$. Carrier $A_2$ and ring gear $R_3$ are connected to each other for simultaneous rotation and are connected to output shaft 2 for simultaneous rotation to provide output torque. Carrier $A_3$ is connectable to input shaft 1 through a third clutch $C_3$.

TABLE 8

| | $C_1$ | $C_2$ | $C_3$ | $B_1$ | $B_2$ | Gear Ratio | Direct Transmission Rate (%) |
|---|---|---|---|---|---|---|---|
| 1st speed | o | | | 0 | | $\dfrac{1+\alpha_2}{\alpha_1}$ | 4.143 | 0 |
| 2nd speed | o | | | | o | $\dfrac{1+\alpha_2}{\alpha_1+\alpha_2}$ | 1.813 | 57 |
| 3rd speed | | | o | o | | $\dfrac{[\alpha_3(1+\alpha_2)+\alpha_2]}{\alpha_1\alpha_3+\alpha_3(1+\alpha_3)}$ | 1.361 | 81 |
| 4th speed | | o | o | | | 1.0 | 1.000 | 100 |
| Rev. | o | | | | o | $-\dfrac{(1+\alpha_2)(1-\alpha_1)}{\alpha_1\alpha_2}$ | −5.984 | 0 |

In the ninth embodiment shown in FIG. 9, a first planetary gear set X is a dual-intermeshed planet pinion The operating sequence of three clutches $C_1$, $C_2$ and $C_3$ and two brakes $B_1$ and $B_2$ of this transmission is tabulated in Table 9 on the assumption that $\alpha_1=\alpha_2=\alpha_3=0.45$.

TABLE 9

| | $C_1$ | $C_2$ | $C_3$ | $B_1$ | $B_2$ | | Gear Ratio | Direct Transmission Rate (%) |
|---|---|---|---|---|---|---|---|---|
| 1st speed | o | | | | o | $\dfrac{1+\alpha_2}{1-\alpha_1}$ | 2.636 | 0 |
| 2nd speed | | o | | | o | $\dfrac{1+\alpha_2}{1-\alpha_1+\alpha_2}$ | 1.450 | 45 |
| 3rd speed | | o | o | | | $\dfrac{[\alpha_2+\alpha_3(1+\alpha_2)]}{\alpha_3(1-\alpha_1)+\alpha_2(1+\alpha_3)}$ | 1.225 | 72.5 |
| 4th speed | | o | o | | | 1.0 | 1.000 | 100 |
| Rev. | o | | | | o | $-\dfrac{\alpha_1(1+\alpha_2)}{\alpha_2(1-\alpha_1)}$ | −2.636 | 0 |

Figure 10:
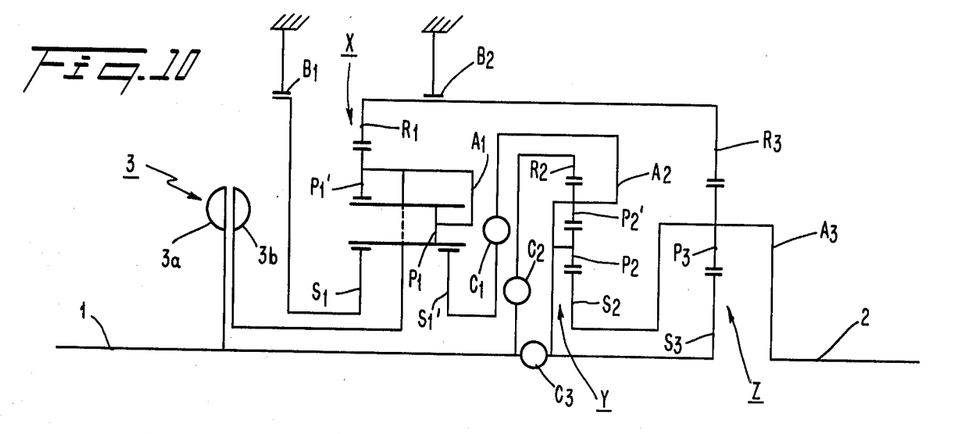

In the tenth embodiment shown in FIG. 10, a first planetary gear set X and a third planetary gear set Z are a dual-intermeshed planet pinion planetary gear set and a basic planetary gear set, respectively, similar to the counterpart shown in FIG. 9, while, a second planetary gear set Y is a dual-intermeshed planet pinion planetary gear set.

Equations (4), (2) and (5) hold for first, second and third planetary gear sets X, Y and Z of this transmission, respectively.

This transmission comprises an input shaft 1, a hydraulic torque converter 3 having a pump 3a connected to the input shaft 1 for simultaneous rotation therewith and a turbine 3b connected to carrier $A_1$ for simultaneous rotation therewith. Sun gear $S_1$ is brakeable by means of a first brake $B_1$. Second sun gear $S_1'$ is engageable with carrier $A_2$ through a first clutch $C_1$, the carrier $A_2$ and sun gear $S_3$ being connected to each other for simultaneous rotation. Ring gear $R_1$ and ring gear $R_3$ are connected to each other for simultaneous rotation and are brakeable by means of a second brake $B_2$. Ring gear $R_2$ is connectable for the input shaft 1 through a second clutch $C_2$, while carrier $A_2$ is connectable to input shaft 1 through a third clutch $C_3$. Sun gear $S_2$ and carrier $A_3$ are connected to each other for simultaneous rotation and are connected to an output shaft 2 for simultaneous rotation and output torque production.

The operating sequence of the three clutches $C_1$, $C_2$ and $C_3$ and the two brakes $B_1$ and $B_2$ of the transmission is tabulated in Table 10 on the assumption that $\alpha_1=\alpha_2=0.60$ and $\alpha_3=0.45$.

TABLE 10

| | $C_1$ | $C_2$ | $C_3$ | $B_1$ | $B_2$ | | Gear Ratio | Direct Transmission Rate (%) |
|---|---|---|---|---|---|---|---|---|
| 1st speed | o | | | | o | $\dfrac{1+\alpha_3}{1-\alpha_1}$ | 3.625 | 0 |
| 2nd speed | | o | o | | | $\dfrac{1+\alpha_3}{\alpha_3+(1-\alpha_1)}$ | 1.706 | 53 |
| 3rd speed | | o | | | o | $\dfrac{[(1-\alpha_2)(1+\alpha_3)+\alpha_2\alpha_3]}{\alpha_3+(1-\alpha_1)(1-\alpha_2)}$ | 1.393 | 74 |
| 4th speed | | o | o | | | 1.0 | 1.000 | 100 |
| Rev. | o | | | | o | $-\dfrac{\alpha_1(1+\alpha_3)}{\alpha_3(1-\alpha_1)}$ | −4.833 | 0 |

Figure 11:
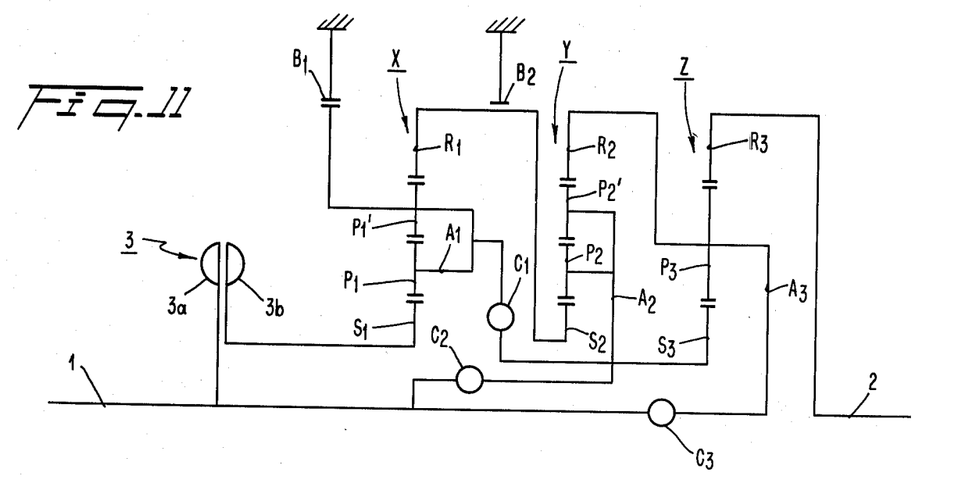

In the eleventh embodiment shown in FIG. 11, a first planetary gear set X and a second planetary gear set Y are dual-intermeshed planet pinion planetary gear sets, respectively, while, a third planetary gear set Z is a basic planetary gear set.

Equations (4), (2) and (5) hold for first, second and third planetary gear sets X, Y and Z, respectively.

This transmission comprises an input shaft 1, a hydraulic torque converter 3 having a pump 3a connected to the input shaft 1 for simultaneous rotation therewith and a turbine 3b connected to sun gear $S_1$ for simultaneous rotation therewith. Carrier $A_1$ is brakeable by means of a first brake $B_1$. Carrier $A_2$ and sun gear $S_3$ are connected to each other for simultaneous rotation and are connectable to carrier $A_1$ through a first clutch $C_1$, and further are connectable to input shaft 1 through a second clutch $C_2$. Ring gear $R_1$ and sun gear $S_2$ are connected to each other for simultaneous rotation and are brakeable by means of a second brake $B_2$. Ring gear $R_2$ and carrier $A_3$ are connected to each other for simultaneous rotation and are connectable to input shaft 1 through a third clutch $C_3$. Ring gear $R_3$ is connected to an output shaft 2 for generating output torque.

The operating sequence of three clutches $C_1$, $C_2$ and $C_3$ and two brakes $B_1$ and $B_2$ of the transmission is tabulated in Table 11 on the assumption that $\alpha_1=0.45$, $\alpha_2=0.40$ and $\alpha_3=0.50$.

TABLE 11

| | $C_1$ | $C_2$ | $C_3$ | $B_1$ | $B_2$ | | Gear Ratio | Direct Transmission Rate (%) |
|---|---|---|---|---|---|---|---|---|
| 1st speed | o | | | | o | $\dfrac{1}{\alpha_1\alpha_2(1+\alpha_3)}$ | 3.704 | 0 |
| 2nd speed | | o | | | o | $\dfrac{1}{(1-\alpha_2-\alpha_2\alpha_3)+\alpha_1\alpha_2(1+\alpha_3)}$ | 1.493 | 60 |
| 3rd speed | | | o | | o | $\dfrac{1-\alpha_2}{(1-\alpha_2-\alpha_2\alpha_3)+\alpha_1\alpha_2\alpha_3}$ | 1.224 | 82 |
| 4th speed | | o | o | | | 1.0 | 1.000 | 100 |
| Rev. | o | | | | o | $-\dfrac{1-\alpha_1}{\alpha_1[(1-\alpha_2)(1+\alpha_3)-\alpha_3]}$ | −3.056 | 0 |

Figure 12:
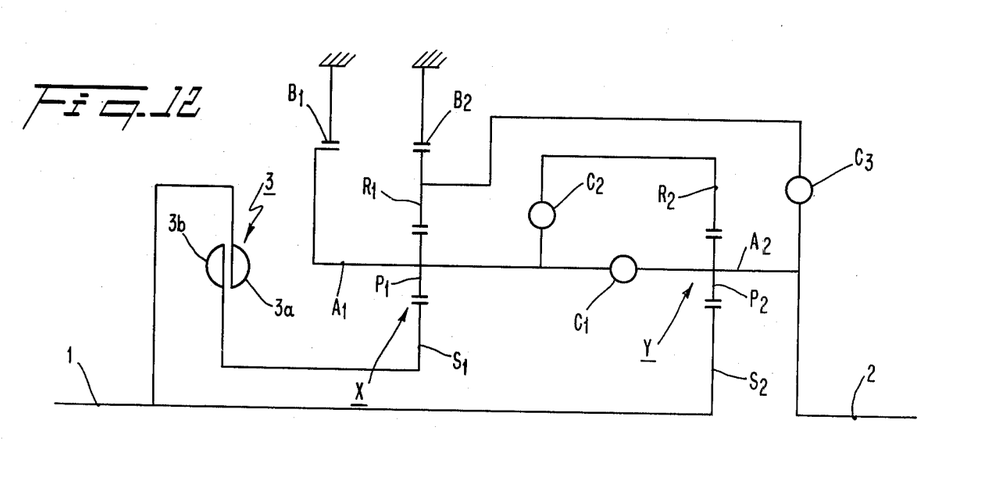

In the twelfth embodiment shown in FIG. 12, this transmission is constructed of two planetary gear sets X and Y which are basic planetary gear sets, respectively.

Equations (1) and (6) hold for first and second planetary gear sets X and Y, respectively.

This transmission comprises an input shaft 1, a hydraulic torque converter 3 having a pump 3a connected to the input shaft 1 for simultaneous rotation therewith and a turbine 3b connected to sun gear $S_1$ for simultaneous rotation therewith. Carrier $A_1$ is brakeable by means of a first brake $B_1$ and is connectable to carrier $A_2$ through a first clutch $C_1$. This carrier $A_2$ is connected to an output shaft 2 for the output torque production. Carrier $A_1$ is connectable to ring gear $R_2$ through a second clutch $C_2$. Sun gear $S_2$ is connected to an output shaft 1 for simultaneous rotation therewith. Ring gear $R_1$ is brakeable by means of a second brake $B_2$ and is connectable to carrier $A_2$ through a third clutch $C_3$.

The operating sequence of three clutches $C_1$, $C_2$ and $C_3$ and two brakes $B_1$ and $B_2$ of this transmission is tabulated in Table 12 on the assumption that $\alpha_1=\alpha_2=0.50$.

TABLE 12

| | $C_1$ | $C_2$ | $C_3$ | $B_1$ | $B_2$ | | Gear Ratio | Direct Transmission Rate (%) |
|---|---|---|---|---|---|---|---|---|
| 1st speed | o | | | | o | $\dfrac{1+\alpha_1}{\alpha_1}$ | 3.000 | 0 |
| 2nd speed | o | o | | | o | $\dfrac{(1+\alpha_1)(1+\alpha_2)}{\alpha_1+\alpha_2+\alpha_1\alpha_2}$ | 1.800 | 60 |
| 3rd speed | o | o | | | | 1.0 | 1.000 | 100 |
| Rev. | | | o | o | | $-\dfrac{1}{\alpha_1}$ | −2.000 | 0 |

In the operation of the several embodiments of the change speed transmission, the shift may be made from first through the fourth speeds in an obvious manner illustrated in each of the Tables 1-12. The torque path in each speed of each embodiment is simply traced through the transmission by properly considering the noted operative or inoperative condition of the clutches $C_1$, $C_2$ and $C_3$ and brakes $B_1$ and $B_2$. As noted above in the discussion of each individual embodiment, when a clutch, $C_1$, $C_2$ and $C_3$ is noted as engaged, the two rotary elements are coupled for simultaneous rotation, and when a brake $B_1$ and $B_2$ is noted as applied, the gear and/or carrier involved is anchored against rotation.

It will now be appreciated that according to the invention, since direct transmission rate is 0% in the first speed or reverse selection, i.e., all of input torque is transmitted through a torque converter 3, smooth startup from the standstill is obtained.

It will also be appreciated that according to the invention since the direct transmission rate is 100% in the highest forward speed selection, i.e., all of the input torque is transmitted through engagement of two of the clutches $C_1$, $C_2$ and $C_3$ bypassing the torque converter 3, increased efficiency and improved fuel economy at highway speeds equivalent to that obtainable through use of a conventional manual transmission with a dry disc clutch are realized.

It will also be appreciated that, since a portion of the input torque is transmitted through the torque converter 3 through the middle forward speeds, smoothness upon making a shift between adjacent speeds is obtained, as desired, rotational vibration at low speeds is suppressed, and at the same time acceptable fuel economy is obtained.

Therefore, in summary, when the transmission of the invention is used, better shifting performance, smooth riding and good fuel economy are obtained.

It will also be appreciated from this description of the various preferred embodiments of the invention, that obvious changes and modifications can be made without departing from the spirit and scope of the invention.

What is claimed is:

1. A change-speed transmission comprising:
an input member (1) to receive the input torque;
an output member (2) to provide the output torque;

a hydrokinetic unit (3) having a pump (3a) connected to said input member for simultaneous rotation therewith and a turbine (3b);

a first and a second and a third clutch ($C_1$, $C_2$, $C_3$);

a planetary gear unit (X, Y, Z) having at least a first, a second and a third rotary element;

said first rotary element of said gear unit being connected to said turbine (3b) through said first clutch for simultaneous rotation therewith when said clutch is engaged;

said third rotary element of said gear unit being connected to said output member for simultaneous rotation therewith;

said input member (1) being connected to said second rotary element through said second clutch ($C_2$) for simultaneous rotation therewith when said clutch is engaged;

said input member being directly connectable through said second and third clutches ($C_2$, $C_3$) to said output member (2) for simultaneous rotation therewith so as to bypass said hydrokinetic unit when said clutches are simultaneously engaged;

whereby the output torque of the transmission may be selectively provided totally through said hydrokinetic unit (3), may be split partially through said hydrokinetic unit (3) and partially through at least one of said second and third clutches thereby providing at least a portion of the output torque to the output member (2) bypassing said hydrokinetic unit (3) and may be totally provided bypassing said hydrokinetic unit (3) by actuation of both said second and third clutches for increased efficiency.

2. A change-speed transmission as claimed in claim 1, in which said planetary gear unit comprises a plurality of planetary gear sets (X, Y, Z) aligned with said input and output members; in which said planetary gear unit comprises first, second and third planetary gear sets each in the form of a dual-intermeshed planet pinion planetary gear set (X, Y, Z) having a sun gear ($S_1$, $S_2$, $S_3$), a ring gear ($R_1$, $R_2$, $R_3$) and a carrier ($A_1$, $A_2$, $A_3$) with pinions ($P_1$, $P_1'$), ($P_2$, $P_2'$), ($P_3$, $P_3'$), respectively, said sun gear ($S_2$) as said first rotary element, said ring gear ($R_3$) as said third rotary element and said carrier ($A_1$) as said second rotary element, in which said sun gear ($S_1$) of said first planetary gear set (X) being connected to said turbine (3b) for simultaneous rotation therewith;

said ring gear ($R_1$) of said first planetary gear set (X), said carrier ($A_2$) of said second planetary gear set (Y) and said sun gear ($S_3$) of said third planetary gear set (Z) being connected to one another for simultaneous rotation therewith;

said ring gear ($R_2$) of said second planetary gear set (Y) being connected to said carrier ($A_3$) of said third planetary gear set (Z) for simultaneous rotation therewith; and said ring gear ($R_3$) being connected to said output member (2) for simultaneous rotation therewith; in which said first clutch ($C_1$) is operable to connect said sun gear ($S_1$) of said first planetary gear set (X) to said sun gear ($S_2$) of said second planetary gear set (Y) for simultaneous rotation therewith;

said second clutch ($C_2$) is operable to connect with carrier ($A_1$) of said first planetary gear set (X) to said input member (1);

said third clutch ($C_3$) operable to connect said carrier ($A_1$) of said first planetary gear set (X) to said output member (2); and a first brake ($B_1$) operable to brake said sun gear ($S_2$) of said second planetary gear set (Y); and a second brake ($B_2$) operable to brake said ring gear ($R_2$) of said second planetary gear set (Y) and said carrier ($A_3$) of said third planetary gear set (Z).

3. A change-speed transmission as claimed in claim 1, in which said planetary gear unit comprises a plurality of planetary gear sets (X, Y, Z) aligned with said input and output members; in which said planetary gear unit comprises first, second and third planetary gear sets (X, Y, Z) each in the form of a dual-intermeshed planet pinion planetary gear set (X, Y, Z) which has a sun gear ($S_1$, $S_2$, $S_3$), a ring gear ($R_1$, $R_2$, $R_3$), and a carrier ($A_1$, $A_2$, $A_3$) with pinions ($P_1$, $P_1'$) ($P_2$, $P_2'$) ($P_3$, $P_3'$), respectively, said sun gear ($S_2$) as said first rotary element, said ring gear ($R_3$) as said third rotary element, and said carrier ($A_1$) as said second rotary element, in which said sun gear ($S_1$) of said first planetary gear set (X) being connected to said turbine (3b) for simultaneous rotation therewith;

said ring gear ($R_1$) of said first planetary gear set (X) and said carrier ($A_2$, $A_3$) of said second and third planetary gear sets (Y, Z) being connected to one another for simultaneous rotation therewith;

said ring gear ($R_2$) of said second planetary gear set (Y) being connected to said sun gear ($S_3$) of said third planetary gear set (Z) for simultaneous rotation therewith; and said ring gear ($R_3$) of said third planetary gear set (Z) being connected to said output member (2) for simultaneous rotation therewith; in which said first clutch ($C_1$) is operable to connect sun gear ($S_1$) of said first planetary gear set (X) to said sun gear ($S_2$) of said second planetary gear set (Y) for simultaneous rotation therewith;

said second clutch ($C_2$) is operable to connect said carrier ($A_1$) of said first planetary gear set (X) to said input member (1); and said third clutch ($C_3$) is operable to connect said carrier ($A_1$) of said first planetary gear set (X) to said output member (2); and a first brake ($B_1$) operable to brake said sun gear ($S_2$) of said second planetary gear set (Y) and a second brake ($B_2$) operable to brake said ring gear ($R_2$) of said second planetary gear set (Y) and said sun gear ($S_3$) of said third planetary gear set (Z).

4. A change-speed transmission as claimed in claim 1, wherein the connection between said turbine (3b) and said first rotary element is further effected through said planetary gear unit;

the connection between said input member (1) and said second rotary element is further effected through said planetary gear unit; and the direct connection between said input member (1) and said output member (2) is further effected through said planetary gear unit.

5. A change-speed transmission comprising:

an input member (1) to receive the input torque;

an output member (2) to provide the output torque;

a hydrokinetic unit (3) having a pump (3a) connected to said input member for simultaneous rotation therewith and a turbine (3b);

a first, a second and a third clutch ($C_1$, $C_2$, $C_3$);

a planetary gear unit (X, Y, Z) having at least a first, a second and a third rotary element;

said first rotary element of said gear unit being selectively connected to said input member (1) through at least one of said first and second clutches, for simultaneous rotation threrewith when the selected clutch is engaged;

said second rotary element of said gear unit being connectable through said third clutch (C$_3$) to said input member (1) for simultaneous rotation therewith when said clutch is engaged;

said output member (2) being connected to said third rotary element of said gear unit for simultaneous rotation therewith;

said input member being connectable through said clutches to said third rotary element for simultaneous rotation therewith so as to totally bypass said hydrokinetic unit when at least two of said clutches are engaged;

whereby the output torque of the transmission may be selectively provided totally through said hydrokinetic unit (3), may be split partially through said hydrokinetic unit (3) and partially through at least one of said second and third clutches thereby providing at least a portion of the output torque to the output member (2) bypassing said hydrokinetic unit (3) and may be totally provided bypassing said hydrokinetic unit (3) by actuation of at least two of said clutches for increased efficiency.

6. A change-speed transmission as claimed in claim 5, in which said planetary gear unit comprises a plurality of planetary gear sets (X, Y, Z) aligned with said input and output members; in which said first and second planetary gear sets each including a dual-intermeshed planet pinion planetary gear set (X, Y) which has a sun gear (S$_1$, S$_2$), a ring gear (R$_1$, R$_2$) and a carrier (A$_1$, A$_2$) with pinions (P$_1$, P$_1$') (P$_2$, P$_2$'), respectively;

a third planetary gear set in the form of a basic planetary gear set (Z) which has a sun gear (S$_3$), a ring gear (R$_3$) and a carrier (A$_3$) with pinion (P$_3$), said carrier (A$_2$) as said first rotary element, said ring gear (R$_3$) as said second rotary element, and said carrier (A$_3$) as said third rotary element, in which said sun gear (S$_1$) of said first planetary gear set (X) is connected to said turbine (3b) for simultaneous rotation therewith;

said carrier (A$_1$) of said first planetary gear set (X) is connected to said sun gear (S$_2$) of said second planetary gear set (Y) for simultaneous rotation therewith;

said ring gear (R$_1$) of said first planetary gear set (X) is connected to said sun gear (S$_3$) of said third planetary gear set (Z); and said ring gears (R$_2$, R$_3$) of said second and third planetary gear sets (Y, Z) are connected to each other for simultaneous rotation; and said carrier (A$_3$) of said third planetary gear set (Z) is connected to said output member (2) for simultaneous rotation therewith; in which said first clutch (C$_1$) is operable to connect said ring gear (R$_1$) of said first planetary gear set (X) and said sun gear (S$_3$) of said third planetary gear set (Z) to said carrier (A$_2$) of said second planetary gear set (Y) for simultaneous rotation therewith;

said second clutch (C$_2$) is operable to connect said carrier (A$_2$) of said second planetary gear set (Y) to said input member (1) for simultaneous rotation therewith; and said third clutch (C$_3$) is operable to connect said ring gears (R$_2$, R$_3$) of said second and third planetary gear sets (Y, Z) to said input member (1) for simultaneous rotation therewith; and in which a first brake (B$_1$) operable to brake said carrier (A$_1$) of said first planetary gear set (X) and said sun gear (S$_2$) of said second planetary gear set (Y), and a second brake (B$_2$) operable to brake said ring gear (R$_1$) of said first planetary gear set (X) and said sun gear (S$_3$) of said third planetary gear set (Z).

7. A change-speed transmission as claimed in claim 5, in which said planetary gear unit comprises a plurality of planetary gear sets aligned with said input and output members; in which a first planetary gear set in the form of a dual-intermeshed planet pinion planetary gear set (X) which has a sun gear (S$_1$), a ring gear (R$_1$) and a carrier (A$_1$) with pinion (P$_1$, P$_1$'); and second and third planetary gear sets each in the form of a basic planetary gear set (Y, Z) which has a sun gear (S$_2$, S$_3$), a ring gear (R$_2$, R$_3$) and a carrier (A$_2$, A$_3$) with pinion (P$_2$) (P$_3$), respectively, said sun gear (S$_2$) as said first rotary element, said ring gear (R$_3$) as said second rotary element, and said carrier (A$_3$) as said third rotary element, in which said sun gear (S$_1$) of said first planetary gear set (X) is connected to said turbine (3b) for simultaneous rotation therewith;

said ring gears (R$_1$,R$_2$) of said first and second planetary gear sets (X, Y) and said sun gear (S$_3$) of said third planetary gear set (Z) are connected to one another for simultaneous rotation therewith; and said carriers (A$_2$, A$_3$) of said second and third planetary gear sets (Y, Z) are connected to said output member (2) for simultaneous rotation therewith; in which said first clutch (C$_1$) is operable to connect said carrier (A$_1$) of said first planetary gear set (X) to said sun gear (S$_2$) of said second planetary gear set (Y) for simultaneous rotation therewith;

said second clutch (C$_2$) is operable to connect said sun gear (S$_2$) of said second planetary gear set (Y) to said input member (1) for simultaneous rotation therewith; and said third clutch (C$_3$) is operable to connect said ring gear (R$_3$) of said third planetary gear set (Z) to said input member (1) for simultaneous rotation therewith; and in which a first brake (B$_1$) operable to brake said carrier (A$_1$) of said first planetary gear set (X); and a second brake (B$_2$) operable to brake said ring gears (R$_1$, R$_2$) of said first and second planetary gear sets (X, Y) and said sun gear (S$_3$) of said third planetary gear set (Z).

8. A change-speed transmission as claimed in claim 5, in which said planetary gear unit comprises a plurality of planetary gear sets aligned with said input and output members; in which first and third planetary gear sets each in the form of a dual-intermeshed planet pinion planetary gear set (X, Y) which has a sun gear (S$_1$, S$_3$), a ring gear (R$_1$, R$_3$), and a carrier (A$_1$, A$_3$) with pinions (P$_1$, P$_1$') (P$_3$, P$_3$'), respectively; and a second planetary gear set in the form of a basic planetary gear set (Y) which has a sun gear (S$_2$), a ring gear ($R_2$), and a carrier ($A_2$) with pinion ($P_2$); in which said sun gear ($S_3$) as said first rotary element, said ring gear ($R_2$) as said second rotary element, and carrier ($A_2$) as said third rotary element;

said sun gear ($S_1$) of said first planetary gear set (X) is connected to said turbine (3b) for simultaneous rotation therewith;

said ring gear ($R_1$) of said first planetary gear set (X), said sun gear ($S_2$) of said second planetary gear set (Y) and said carrier ($A_3$) of said third planetary gear set (Z) are connected to one another for simultaneous rotation therewith;

said ring gear ($R_2$) of said second planetary gear set (Y) and said ring gear ($R_3$) of said third planetary gear set (Z) are connected to each other for simultaneous rotation therewith; and said carrier ($A_2$) of said second planetary gear set (Y) is connected to said output member (2) for simultaneous rotation therewith; in which said first clutch ($C_1$) is operable to connect said carrier ($A_1$) of said first planetary gear set (X) to said sun gear ($S_3$) of said third planetary gear set (Z) for simultaneous rotation therewith;

said second clutch ($C_2$) is operable to connect said sun gear ($S_3$) of said third planetary gear set (Z) to said input member (1) for simultaneous rotation therewith; and said third clutch ($C_3$) is operable to connect said ring gears ($R_2$, $R_3$) of said second and third planetary gear sets (Y, Z) to said input member (1) for simultaneous rotation therewith; and in which a first brake ($B_1$) operable to brake said carrier ($A_1$) of said first planetary gear set (X); and a second brake ($B_2$) operable to brake said ring gear ($R_1$) of said first planetary gear set (X), said sun gear ($S_2$) of said second planetary gear set (Y) and said carrier ($A_3$) of said third planetary gear set (Z).

9. A change-speed transmission as claimed in claim 5, in which said planetary gear unit comprises a plurality of planetary gear sets aligned with said input and output members; in which first and second planetary gear sets each in the form of a dual-intermeshed planet pinion planetary gear set (X, Y) which has a sun gear ($S_1$, $S_2$), a ring gear ($R_1$, $R_2$) and a carrier ($A_1$, $A_2$) with pinion ($P_1$, $P_1'$) ($P_2$, $P_2'$), respectively, and a third planetary gear set in the form of a basic planetary gear set (Z) which has a sun gear ($S_3$), a ring gear ($R_3$) and a carrier ($A_3$) with pinion ($P_3$); in which said carrier ($A_2$) as said first rotary element, said ring gear ($R_2$) as said second rotary element, and carrier ($A_3$) as said third rotary element;

said sun gear ($S_1$) of said first planetary gear set (X) is connected to said turbine (3b) for simultaneous rotation therewith;

said ring gears ($R_1$, $R_3$) of said first and third planetary gear sets (X, Z) and said sun gear ($S_2$) of said second planetary gear set (Y) are connected to one another for simultaneous rotation therewith;

said carrier ($A_2$) of said second planetary gear set (Y) is connected to said sun gear ($S_3$) of said third planetary gear set (Z) for simultaneous rotation therewith; and said carrier ($A_3$) of said third gear set (Z) is connected to said output member (2) for simultaneous rotation therewith; in which said first clutch ($C_1$) is operable to connect said carrier ($A_1$) of said first planetary gear set (Z) to said carrier ($A_2$) of said second planetary gear set (Y) and said sun gear ($S_3$) of said third planetary gear set (Z) for simultaneous rotation therewith;

said second clutch ($C_2$) is operable to connect said carrier ($A_2$) of said second planetary gear set (Y) and said sun gear ($S_3$) of said third planetary gear set (Z) to said input member (1) for simultaneous rotation therewith; and said third clutch ($C_3$) is operable to connect said ring gear ($R_2$) of said second planetary gear set (Y) to said input member (1) for simultaneous rotation therewith; and in which a first brake ($B_1$) operable to brake said carrier ($A_1$) of said first planetary gear set (X); and a second brake ($B_2$) operable to brake said ring gear ($R_1$) of said first planetary gear set (X), said sun gear ($S_2$) of said second planetary gear set (Y) and said ring gear ($R_3$) of said third planetary gear set (Z).

10. A change-speed transmission as claimed in claim 5, in which said planetary gear unit comprises a plurality of planetary gear sets aligned with said input and output members; in which a first planetary gear set in the form of a dual-intermeshed planet pinion planetary gear set (X) which has a sun gear ($S_1$), a ring gear ($R_1$) and a carrier ($A_1$) with pinion ($P_1$, $P_1'$); and second and third planetary gear sets each in the form of a basic planetary gear set (Y, Z) which has a sun gear ($S_2$, $S_3$), a ring gear ($R_2$, $R_3$) and a carrier ($A_2$, $A_3$) with pinion ($P_2$) ($P_3$), respectively, in which said sun gear ($S_2$) as said first rotary element, said carrier ($A_3$) as said second rotary element, and said ring gear ($R_3$) as said third rotary element;

said sun gear ($S_1$) of said first planetary gear set (X) is connected to said turbine (3b) for simultaneous rotation therewith;

said sun gears ($S_2$, $S_3$) of said second and third planetary gear sets (Y, Z) are connected to each other for simultaneous rotation therewith;

said ring gears ($R_1$, $R_2$) of said first and second planetary gear sets (X, Y) are connected to each other for simultaneous rotation therewith; and said carrier ($A_2$) of said second planetary gear set (X) and said ring gear ($R_3$) of said third planetary gear set (Z) are connected to said output member (2) for simultaneous rotation therewith; in which said first clutch ($C_1$) is operable to connect said carrier ($A_1$) of said first planetary gear set (X) to said sun gears ($S_2$, $S_3$) of said second and third planetary gear sets (Y, Z) for simultaneous rotation therewith;

said second clutch ($C_2$) is operable to connect said sun gears ($S_2$, $S_3$) of said second and third planetary gear sets (Y, Z) to said input member (1) for simultaneous rotation therewith; and said third clutch ($C_3$) is operable to connect said carrier ($A_3$) of said third planetary gear set (Z) to said input member (1) for simultaneous rotation therewith; in which a first brake ($B_1$) operable to brake said carrier ($A_1$) of said first planetary gear set (X); and a second brake ($B_2$) operable to brake said ring gears ($R_1$, $R_2$) of said first and second planetary gear sets (X, Y).

11. A change-speed transmission as claimed in claim in which said planetary gear unit comprises a plurality of planetary gear sets aligned with said input and output members; in which a first planetary gear set in the form of a dual-intermeshed planet pinion planetary gear set (X) which has first and second sun gears ($S_1$, $S_1'$), a ring gear ($R_1$) and a carrier ($A_1$) with pinion ($P_1$, $P_1'$); and second and third planetary gear sets each in the form of a basic planetary gear set (Y, Z) which has a sun gear ($S_2$, $S_3$), a ring gear ($R_2$, $R_3$) and a carrier ($A_2$, $A_3$) with pinion ($P_2$)($P_3$), respectively, in which said sun gear ($S_3$) as said first rotary element, said carrier ($A_3$) as said second rotary element, and ring gear ($R_3$) as said third rotary element;

said carrier ($A_1$) of said first planetary gear set (X) is connected to said turbine (3b) for simultaneous rotation therewith;

said ring gears ($R_1$, $R_2$) of said first and second planetary gear sets (X, Y) are connected to each other for simultaneous rotation therewith;

said sun gears ($S_2$, $S_3$) of said second and third planetary gear sets (Y, Z) are connected to each other for simultaneous rotation therewith; and said carrier ($A_2$) of said second planetary gear set (Y) and said ring gear ($R_3$) of said third planetary gear set (Z) are connected to said output member (2) for simultaneous rotation therewith; in which said first clutch ($C_1$) is operable to connect said second sun gear ($S_1'$) of said first planetary gear set (X) to said sun gears ($S_2$, $S_3$) of said second and third planetary gear sets (Y, Z) for simultaneous rotation therewith;

said second clutch ($C_2$) is operable to connect said sun gears ($S_2$, $S_3$) of said second and third planetary gear sets (Y, Z) to said input member (1) for simultaneous rotation therewith;

said third clurch ($C_3$) is operable to connect said carrier ($A_3$) of said third planetary gear set (Z) to said input member (1) for simultaneous rotation therewith; and in which a first brake ($B_1$) operable to brake said first sun gear ($S_1$) of said first planetary gear set (X); and a second brake ($B_2$) operable to brake said ring gears ($R_1$, $R_2$) of first and second planetary gear sets (X, Y).

12. A change-speed transmission as claimed in claim in which said planetary gear unit comprises a plurality of planetary gear sets aligned with said input and output members; in which a first planetary gear set in the form of a dual-intermeshed planet pinion planetary gear set (X) which has first and second sun gears ($S_1$, $S_1'$), a ring gear ($R_1$) and a carrier ($A_1$) with pinion ($P_1$, $P_1'$);

a second planetary gear set in the form of a dual-intermeshed planet pinion planetary gear set (Y) which has a sun gear ($S_2$), a ring gear ($R_2$) and a carrier ($A_2$) with pinion ($P_2$, $P_2'$); and a third planetary gear set in the form of a basic planetary gear set (Z) which has a sun gear ($S_3$), a ring gear ($R_3$) and a carrier ($A_3$) with pinion ($P_3$); in which said carrier ($A_2$) as said first rotary element, said sun gear ($S_3$) as said second rotary element, and said carrier ($A_3$) as said third rotary element;

said carrier ($A_1$) of said first planetary gear set (X) is connected to said turbine (3b) for simultaneous rotation therewith;

said ring gears ($R_1$, $R_3$) of said first and third planetary gear sets ($A_1$, $A_3$) are connected to each other for simultaneous rotation therewith;

said carrier ($A_2$) of said second planetary gear set (Y) is connected to said sun gear ($S_3$) of said third planetary gear set (Z) for simultaneous rotation therewith; and said sun gear ($S_2$) of said second planetary gear set (Y) and said carrier ($A_3$) of said third planetary gear set (Z) are connected to said output member (2) for simultaneous rotation therewith; in which said first clutch ($C_1$) is operable to connect said second sun gear ($S_1'$) of said first planetary gear set (X) to said carrier ($A_2$) of said second planetary gear set (Y) and said sun gear ($S_3$) of said third planetary gear set (Z) for simultaneous rotation therewith;

said second clutch ($C_2$) is operable to connect said ring gear ($R_2$) of said second planetary gear set (Y) to said input member (1) for simultaneous rotation therewith; and said third clutch ($C_3$) is operable to connect said carrier ($A_2$) of said second planetary gear set (Y) to said input member (1) for simultaneous rotation therewith; in which a first brake ($B_1$) operable to brake said first sun gear ($S_1$) of said planetary gear set (X); and a second brake ($B_2$) operable to brake said ring gears ($R_1$, $R_3$) of said first and third planetary gear sets (X, Z).

13. A change-speed transmission as claimed in claim 5, in which said planetary gear unit comprises a plurality of planetary gear sets aligned with said input and output members; in which first and second planetary gear sets each in the form of a dual-intermeshed planet pinion planetary gear set (X, Y) which has a sun gear ($S_1$, $S_2$), a ring gear ($R_1$, $R_2$) and a carrier ($A_1$, $A_2$) with pinion ($P_1$, $P_1'$) ($P_2$, $P_2'$), respectively, and a third planetary gear set in the form of a basic planetary gear set (Z) which has a sun gear ($S_3$), a ring gear ($R_3$) and a carrier ($A_3$) with pinion ($P_3$); in which said sun gear ($S_3$) as said first rotary element, said carrier ($A_3$) as said second rotary element, and ring gear ($R_3$) as said third rotary element;

said sun gear ($S_1$) of said first planetary gear set (X) is connected to said turbine (3b) for simultaneous rotation therewith;

said ring gear ($R_1$) of said first planetary gear set (X) is connected to said sun gear ($S_2$) of said second planetary gear set (Y) for simultaneous rotation therewith;

said carrier ($A_2$) of said second planetary gear set (Y) is connected to said sun gearm ($S_3$) of said third planetary gear set (Z) for simultaneous rotation therewith;

said ring gear ($R_2$) of said second planetary gear set (Y) is connected to said carrier ($A_3$) of said third planetary gear set (Z) for simultaneous rotation therewith; and said ring gear ($R_3$) of said third planetary gear set (Z) is connected to said output member (2) for simultaneous rotation therewith; in which said first clutch ($C_1$) is operable to connect said carrier ($A_1$) of said first planetary gear set (X) to said carrier ($A_2$) of said second planetary gear set (Y) and said sun gear ($S_3$) of said third planetary gear set (Z) for simultaneous rotation therewith;

said second clutch ($C_2$) is operable to connect said carrier ($A_2$) of said second planetary gear set (Y) and said sun gear ($S_3$) of said third planetary gear set (Z) to said input member (1) for simultaneous rotation therewith; and said third clutch ($C_3$) is operable to connect said carrier ($A_3$) of said third planetary gear set (Z) and said ring gear ($R_2$) of said second planetary gear set (Y) to said input member (1) for simultaneous rotation therewith; in which a first brake ($B_1$) operable to brake said carrier ($A_1$) of said first planetary gear set (X); and a second brake ($B_2$) operable to brake said ring gear ($R_1$) of said first planetary gear set (X) and said sun gear ($S_2$) of said second planetary gear set (Y).

14. A change-speed transmission comprising:
an input member (1) to receive the input torque;
an output member (2) to provide the output torque;
a hydrokinetic unit (3) having a pump (3a) connected to said input member for simultaneous rotation therewith and a turbine (3b);
a first and a second and a third clutch ($C_1$, $C_2$, $C_3$);
a planetary gear unit (X, Y) having at least a first, a second and a third rotary element;
said planetary gear unit comprising
first and second planetary gear sets each in the form of a basic planetary gear set (X, Y) which has a sun gear ($S_1$, $S_2$), a ring gear ($R_1$, $R_2$) and a carrier ($A_1$, $A_2$) with pinion ($P_1$)($P_2$), respectively; in which
said sun gear ($S_1$) of said first planetary gear set (X) is connected to said turbine (3b) for simultaneous rotation therewith;
said sun gear ($S_2$) of said second planetary gear set (Y) is connected to said input member (1) for simultaneous rotation therewith; and
said carrier ($A_2$) of said second planetary gear set (Z) is connected to said output member (2) for simultaneous rotation therewith; and in which
said first clutch ($C_1$) is operable to connect said carrier ($A_1$) of said first planetary gear set (X) to said carrier ($A_2$) of said second planetary gear set (Y) for simultaneous rotation therewith;
a second clutch ($C_2$) operable to connect said carrier ($A_1$) of said first planetary gear set (X) to said ring gear ($R_2$) of said second planetary gear set (Y) for simultaneous rotation therewith;
a third clutch ($C_3$) is operable to connect said ring gear ($R_1$) of said first planetary gear set to said output member (2) for simultaneous rotation therewith; and in which
a first brake ($B_1$) operable to brake said carrier ($A_1$) of said first planetary gear set (X); and
a second brake ($B_2$) operable to brake said ring gear ($R_1$) of said first planetary gear set (X).

15. A change-speed transmission comprising:
an input member (1) to receive the input torque;
an output member (2) to provide the output torque;
a planetary gearing unit having a plurality of planetary gear sets, each having at least three rotary elements including a sun gear, a ring gear and a carrier with pinion;
a hydrokinetic unit (3) having a pump (3a) connected to said input member (1) for simultaneous rotation therewith and a turbine (3b) connected to said planetary gearing unit; and
at least three clutch means ($C_1$, $C_2$, $C_3$) and at least two brake means ($B_1$, $B_2$) operable to shift said planetary gearing unit into a condition in which all of torque of said input member is transmitted to said output member through said hydrokinetic unit (3) and said planetary gearing unit to provide the highest reduction gear ratio of all forward speeds, operable to shift said planetary gearing unit into a condition in which all of the torque of said input member (1) is transmitted to said output member (2) bypassing said hydrokinetic unit (3) to provide direct drive to said output member, and further operable to shift said planetary gearing unit into a condition in which a portion of the torque of said input member (1) is transmitted to said output member (2) bypassing said hydrokinetic unit (3), and the remaining portion of the torque of said input member (1) is transmitted to said output member (2) through said hydrokinetic unit (3) to provide at least one intermediate reduction gear ratio of the forward speeds, whereby the output torque of the transmission may be selectively provided totally through said hydrokinetic unit (3), may be split partially through said hydrokinetic unit (3) and partially through at least one of said second and third clutches thereby providing at least a portion of the output torque to the output member (2) bypassing said hydrokinetic unit (3) and may be totally provided bypassing said hydrokinetic unit (3) by actuation of at least two of said clutches for increased efficiency.

16. A change-speed transmission comprising:
an input member (1) to receive the input torque;
an output member (2) to provide the output torque;
a hydrokinetic unit (3) having a pump (3a) connected to said input member for simultaneous rotation therewith and a turbine (3b);
a first and a second and a third clutch ($C_1$, $C_2$, $C_3$);
a planetary gear unit (X, Y, Z) having at least a first, a second and a third rotary element;
said planetary gear unit comprising a plurality of planetary gear sets (X, Y, Z) aligned with said input and output members; in which said first planetary gear set (X) having a sun gear ($S_1$) as said first rotary element, a ring gear ($R_1$) and a carrier ($A_1$) with pinion ($P_1$); and
second and third planetary gear sets (Y, Z) each in the form of a dual-intermeshed planet pinion planetary gear set which has a sun gear ($S_2$, $S_3$), a ring gear ($R_2$, $R_3$) and a carrier ($A_2$, $A_3$), with pinion ($P_2'$, $P_3'$), respectively, said sun gear ($S_1$) as said first rotary element, said ring gear ($R_3$) as said second rotary element and said carrier ($A_3$) as said third rotary element, in which
said carrier ($A_2$) of said second planetary gear set (Y) being connected to said turbine (3b);
said sun gear ($S_2$) of said second planetary gear set (Y) being connected to said sun gear ($S_1$) of said first planetary gear set (X) for simultaneous rotation therewith;
said ring gear ($R_1$) of said first planetary gear set (X) being connected to said ring gear ($R_3$) of said third planetary gear set (Z) for simultaneous rotation therewith and being connected to said output number (2) for simultaneous rotation therewith; and
said ring gear ($R_2$) of said second planetary gear set (Y) being connected to said sun gear ($S_3$) of said third planetary gear set (Z) for simultaneous rotation therewith; and in which
said first clutch ($C_1$) being operable to connect said sun gears ($S_1$, $S_2$) of said first and second planetary gear sets (X, Y) to said carrier ($A_2$) of said second planetary gear set (Y) for simultaneous rotation therewith;

said second clutch ($C_2$) being operable to connect said carrier ($A_3$) of said third planetary gear set (Z) to said input member (1) for simultaneous rotation therewith; and said third clutch ($C_3$) being operable to connect said carrier ($A_3$) of said third planetary gear set (Z) to said output member (2) for simultaneous rotation therewith; and a first brake ($B_1$) operable to brake said sun gears ($S_1$, $S_2$) of said first and second planetary gear sets (X, Y) and a second brake ($B_2$) operable to brake said carrier ($A_1$) of said first planetary gear set (X).

* * * * *